United States Patent [19]

Craig

[11] 4,348,444
[45] Sep. 7, 1982

[54] NONWOVEN FABRIC FROM A COMBINATION OF THERMOPLASTIC NETTING AND ORIENTED FILM

[75] Inventor: Alan D. Craig, Wilmington, Del.

[73] Assignee: Hercules Incorporated, Wilmington, Del.

[21] Appl. No.: 299,710

[22] Filed: Sep. 8, 1981

[51] Int. Cl.³ .............................................. B32B 5/12
[52] U.S. Cl. ................................... 428/137; 156/161; 156/244.12; 156/244.19; 156/285; 156/290; 156/306.6; 428/247; 428/252; 428/255
[58] Field of Search ............. 428/137, 138, 247, 252, 428/255; 156/161, 244.12, 244.19, 285, 290, 306.6

[56] References Cited

U.S. PATENT DOCUMENTS 2,919,467  1/1960  Mercer ................................. 18/12
3,914,365  10/1975 Kim et al. ........................... 264/147
4,144,368  3/1979  Kim et al. ........................... 428/105
4,211,852  7/1980  Matsuda et al. ..................... 525/240

FOREIGN PATENT DOCUMENTS 47-15489  8/1972  Japan .

Primary Examiner—Marion McCamish
Attorney, Agent, or Firm—Joshua W. Martin, III

[57] ABSTRACT

A family of reinforced net structures which include oriented polypropylene netting with oriented propylene/1-butene copolymer film as an adhesive, and a process for making these nonwoven fabrics.

13 Claims, 4 Drawing Figures

NONWOVEN FABRIC FROM A COMBINATION OF THERMOPLASTIC NETTING AND ORIENTED FILM

BACKGROUND OF THE INVENTION

This invention relates generally to nonwoven fabrics and, more particularly, to a family of reinforced net structures which are formed by combining biaxially oriented thermoplastic copolymer films, and oriented polypropylene netting. These nonwoven fabrics have a unique combination of properties including strength, tear resistance, air permeability, and in cases where two or more layers of oriented netting are employed, the fabric has excellent interlaminary adhesion and high sewn seam strength.

DESCRIPTION OF THE PRIOR ART

Nonwoven fabrics have been produced by bonding sheets of thermoplastic netting together. Exemplary patents are U.S. Pat. No. 3,914,365 and U.S. Pat. No. 4,144,368. This latter reference indicates that two or more layers of network structures, having the same or different configurations so that the main filaments cross in various directions, can be laminated to provide a multilayer product. Another reference which discloses the lamination of extruded net fabrics under pressure and heat or by cementing is U.S. Pat. No. 2,919,467. Disadvantages of such laminates include low burst, tear and tensile strength, and a tendency to delaminate when bonded at temperatures at which the orientation strength and configuration of the polypropylene netting is retained.

The product of the instant invention uses oriented propylene/1-butene copolymer film as an adhesive to improve tear resistance and, in cases where two or more layers of netting are employed, to provide a high strength bond between the various layers of oriented polypropylene netting. Among the advantages of such layered netting are increased tensile and tear strength and resistance to delamination. In addition, the product of this invention can have enhanced strrepresents a way of reinforcing a single layer of netting and of bonding two layers of netting together to prevent delamination while retaining a significant percentage of the permeability of the netting.

SUMMARY OF THE INVENTION

This invention includes a thermoplastic reticulate open netting structure comprising a first layer of oriented polypropylene netting, a second layer of random copolymer formed from a biaxially oriented film, the film consisting essentially of a copolymer having between about 7% to about 30% 1-butene and between about 93% to 70% propylene, said copolymer having an intrinsic viscosity of between about 1.1 and 4.0. Optionally and preferably, a third layer of oriented polypropylene netting is also employed, the first, second and third layers being bonded together with the second layer between the first and third layers. The second layer, having been fused, is no longer an oriented film, but serves as an adhesive between the two net layers. The orientation in the original film causes the film to shrink. Under the conditions of the lamination, the film adheres to the open nets and a significant percentage of the permeability of the nets is retained.

DESCRIPTION OF THE INVENTION

Figure 1:
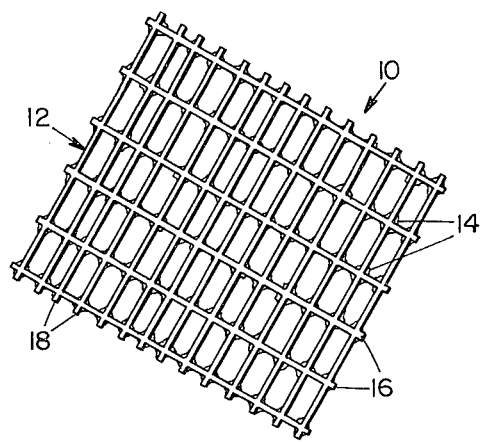
FIG. 1 is a schematic fragmentary perspective view of a nonwoven fabric embodying the features of this invention.

Referring to the drawings in detail, there is illustrated in FIG. 1 a nonwoven fabric 10 in the form of a laminate which is a product of this invention. The embodiment of FIG. 1 depicts a layer of nonwoven continuous linearly oriented polypropylene netting 12 coated with a copolymer 14 formed from a layer of biaxially oriented propylene/1-butene copolymer film. Netting layer 12 has main filaments 16 and tie filaments 18.

To provide the requisite strength, in accordance with the invention, the netting is bonded to the thin biaxially oriented thermoplastic copolymer film which shrinks under the conditions of bonding so that the copolymer, which is a copolymer of propylene and 1-butene, essentially conforms to the shape of the netting.

Combining layers 12 and 14 in a continuous manner can provide a product that is suitable as a kraft paper reinforcement, reinforcing scrim for plastic film or as a furniture skirt liner or duster cover.

Figure 2:
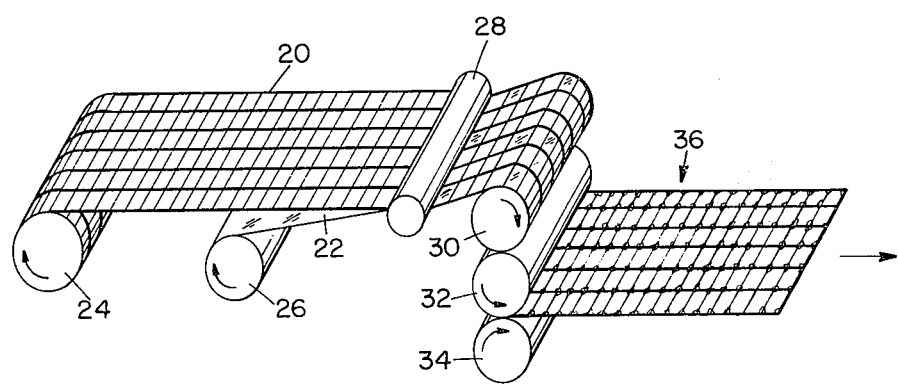
FIG. 2 is a schematic perspective view illustrating apparatus for making nonwoven fabric structures in accordance with the principles of this invention.

FIG. 2 shows schematically a process for continuously preparing the nonwoven fabric shown in FIG. 1. In FIG. 2 there is shown a thermoplastic netting layer 20 and a layer of thermoplastic film 22 being fed from supply rolls 24 and 26, respectively. The two layers 20 and 22 pass under guide roll 28 before contacting rolls 30, 32 and 34, of a vertical calender stack. Under the pressure and heat supplied by the rolls, the film adheres strongly to the netting and opens due to shrinkage so that the copolymer is essentially confined to the filaments and crossover points of the netting. The nonwoven fabric of this invention 36 is nonwoven netting with enhanced strength provided by the coating of copolymer.

Figure 3:
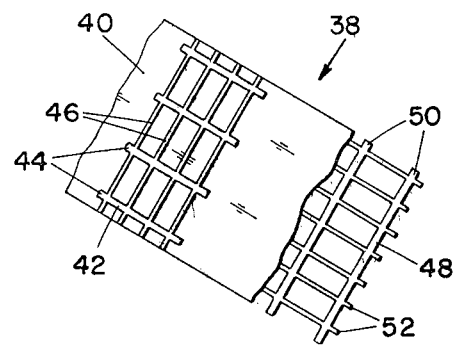
FIG. 3 is a fragmentary perspective view with sections broken away, showing an additional embodiment of the present invention prior to lamination.

FIG. 3 shows another embodiment of the subject invention prior to lamination where a three layer structure 38 is shown. The inner layer 40 represents a biaxially oriented thermoplastic propylene/1-butene copolymer film. Outer layer 42 is a layer of polypropylene nonwoven netting having main filaments 44 and tie filaments 46 which are orthogonal to main filaments 44. The other outer layer 48 also consists of nonwoven polypropylene netting. Layer 48 has main filaments 50 and tie filaments 52 which are orthogonal to main filaments 50. Outer layers 42 and 48 are orthogonally oriented with respect to each other wherein, for example, the main filaments 44 of outer layer 42 are at a 90-degree angle to the main filaments 50 of outer layer 48. Since the main filaments of the nonwoven netting layers may have higher strength properties as compared to the respective tie filaments, the orientation of layers 42 and 48 in laminate structure 38 can provide substantially enhanced strength characteristics.

Figure 4:
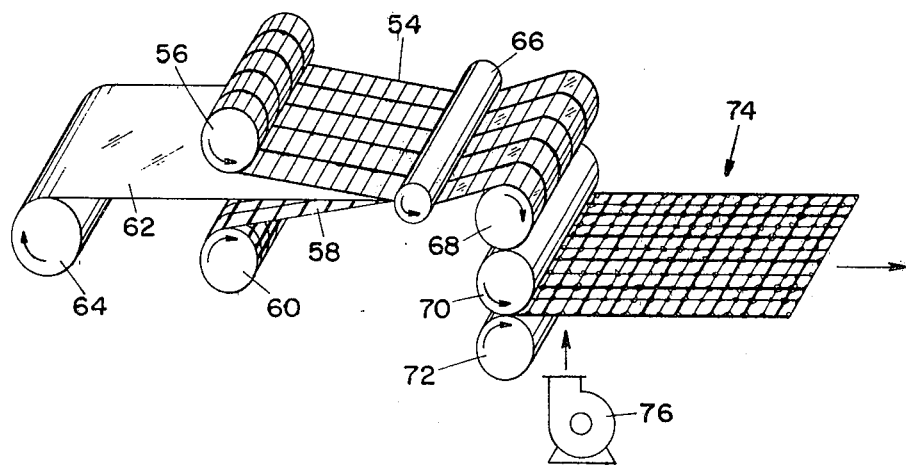
FIG. 4 is a schematic perspective view illustrating other apparatus for making fabric structures in accordance with the principles of this invention.

FIG. 4 shows, schematically, a process which can be used for the manufacture of nonwoven fabrics in accordance with this invention based on the structure shown in FIG. 3. If a composite structure similar to that of FIG. 3 is used, netting layer 54 would be supplied from supply roll 56. Netting layer 58, having its main and tie filaments at a 90° angle to the main and tie filaments of layer 54, respectively, is fed from supply roll 60. Biaxially oriented thermoplastic film 62 is fed from supply roll 64 to form the adhesive of the laminate. Optionally film 62 can be fed directly from an extruder. The three layers pass over heated guide roll 66, into and through vertical calender stack rolls 68, 70 and 72 wherein the three layers are bonded together. The laminated fabric 74 is then fed to a take-up spool (not shown). Optionally blower 76 can be used to blow air on the laminated fabric 74 after it exits the nip created by rolls 70 and 72. The air emerging from blower 76 and impinging on laminated fabric 74 while it is still hot, aids in assuring that the oriented film will open subsequent to the application of heat and pressure to maintain the permeability of the netting. The thickness of the layer of the copolymer between or on the filaments of the polypropylene netting is preferably between about 0.25 mils and about 1.0 mil. In one embodiment the polypropylene nets have main filaments in one direction and smaller connecting filaments in the opposite direction, the main filaments of one of the netting layers being essentially perpendicular to the main filaments of the other netting layer. Terminated fabric 74 represents a nonwoven fabric formed by the process shown in FIG. 4. Such products are suitable for use as upholstery backing fabrics and decking and as geotextile fabrics.

The invention includes the process of making an open net fabric by heating a composite consisting of one or two oriented polypropylene netting layers with a layer of biaxially oriented random copolymer film of propylene and 1-butene between them at a temperature between about 5° C. above the crystalline melting point of the copolymer and about 150° C. The latter temperature is the highest temperature to which the oriented polypropylene nets can be heated without causing significant shrinkage of the nets. The oriented copolymer film contains between about 7% and about 30% 1-butene and between about 93% and about 70% propylene. It is biaxially oriented, preferably at a level of between about two times and six times in both directions. More preferably, the film should be stretched by a factor of at least 4. Such biaxial orientation is carried out at a temperature below about 125° so that the film will have shrinkage over 10% in each direction on heating to 110° C. or above. Under the conditions of heating the composite, the copolymer film adheres strongly to the polypropylene filaments at the surfaces with which it is in contact. In addition, the copolymer film shrinks before melting to the extent that it contributes to opening at the spaces in which the filaments of the two nets are not in contact. Thus, in one embodiment, an open net structure made up of a laminate of two oriented polypropylene nets firmly bonded together is formed. In order to assure formation of the uniformly opened net, it may be desirable to direct a stream of air against the netting structure while it is still at an elevated temperature.

The oriented polypropylene netting or network structures used in this invention may be of the types disclosed in the prior art. Examples of netting useful in this invention are Mercer (U.S. Pat. Nos. 4,020,208 and 4,059,713); Larsen (U.S. Pat. No. 4,152,479); Kim et al. (U.S. Pat. Nos. 3,914,365); and Liu (U.S. Pat. No. 4,140,826). Woven netting of polypropylene fibers may also be employed.

The netting may be composed of either a polypropylene homopolymer, a propylene-ethylene random copolymer containing 2% to 10% ethylene or a propylene-ethylene block copolymer containing 2% to 25% ethylene, and may be either natural or pigmented.

Preferably the netting should have uniform network structure. There should be at least two sets of strands wherein each set of strands crosses another set of strands at a fixed angle and the netting should have uniformly sized openings. Preferred types of thermoplastic netting useful in this invention are disclosed in U.S. Pat. Nos. 4,144,368 and 4,207,375 to Kim et al., incorporated herein by reference.

The thermoplastic film used in this invention, is a copolymer of propylene and 1-butene containing approximately 7% to 30% 1-butene. This copolymer gives excellent adhesion to oriented polypropylene netting at temperatures which do not cause a significant loss of orientation of the polypropylene. The preferred materials are random propylene/1-butene copolymers which have crystalline melting points significantly below the crystalline melting points of either polypropylene homopolymers, random ethylene-propylene copolymers containing up to 10% ethylene or block copolymers containing up to 25% ethylene. These $C_3$–$C_4$ copolymers are compatible with polypropylene and $C_2$–$C_3$ copolymers which are used in the netting and thus form an extremely good bond without requiring melting or distortion of the propylene homopolymer or $C_2$–$C_3$ copolymer netting. Preferably the 1-butene content may range from 8% to 18%. The crystalline melting points of the copolymer containing 8% butene is about 140° C., while that containing 18% butene is about 130° C.

In order to provide the shrinkage properties which assist in forming an open network structure during the lamination with polypropylene netting, the propylene-butene copolymer film must be biaxially oriented, i.e., drawn in perpendicular directions, at a temperature below its crystalline melting point. Such orientation increases its strength and provides a thin film which shrinks, on heating to temperatures approaching the orientation temperature and on subsequent melting. Such orientation can be carried out by sequential operations which normally involve a combination of machine direction stretching between differential speed rolls and lateral are well known and are not part of this invention.

The oriented films may be from about 0.25 mils to about 2 mils in thickness, and preferably from about 0.25 to about 1 mil in thickness.

Shrinkage properties of oriented films of copolymers of propylene and 1-butene are given in Table I, showing the effect of the composition and of the degree of orientation on films made from copolymers with various monomer ratios. It is apparent that the degree of orientation and the orientation temperature have a significant effect on the strength and shrinkage properties of the films.

TABLE I

| % Butene in Copolymer | Melting Point °C. | Degree of Orientation | Temperature of Orientation °C. | Tensile Strength (P.S.I.) | Modulus (P.S.I.) | Elongation (%) | % Shrinkage 5 Min. @ 110° C. |
|---|---|---|---|---|---|---|---|
| 8  | 140 | 4 × 4 | 115 | 20,000 | 180,000 | 120 | 10 |
| 8  | 140 | 6 × 6 | 120 | 36,000 | 460,000 | 50  | 16 |
| 14 | 135 | 4 × 4 | 110 | 17,200 | 232,000 | 87  | 20 |
| 14 | 135 | 6 × 6 | 110 | 33,000 | 430,000 | 50  | 25 |
| 18 | 130 | 2 × 2 | 105 | 7,800  | 98,000  | 320 | 15 |
| 18 | 130 | 4 × 4 | 105 | 16,200 | 162,000 | 100 | 30 |
| 18 | 130 | 6 × 6 | 105 | 30,000 | 390,000 | 40  | 35 |

The network structure used in this invention may include two or more layers of network structures having the same or different configurations so that the main filaments cross in various directions to provide a multi-layer product having certain desired strength characteristics. For example, orthogonal constructions can be made wherein the main filaments of one layer cross at 90° to the main filaments of another layer to simulate the appearance and physical properties of woven fabrics and to provide high strength and tear resistance in two directions. Fabrics made from three or more layers of networks bonded together by layers of biaxially oriented film, each network having the main filaments in different directions have excellent dimensional stability, high strength and tear resistance in all directions and high burst strength. For example, isometric constructions can be used wherein the main filaments of at least four layers are positioned at about 45° angles to each other, to provide strength in all directions of the laminate with dimensional stability heretofore unobtainable in woven net or other nonwoven fabric structures with equivalent unit weight.

The advantage of the biaxially oriented propylene/1-butene copolymer film is that the copolymer adheres strongly to the oriented polypropylene netting at temperatures which do not cause the netting to shrink and the film opens during lamination such that a higher strength open netting or laminate is obtained. The bonding temperature of the process must be below the shrink temperature of the netting. The recommended range is between 5° above the crystalline melting point of the copolymer film and about 150° C. The thermoplastic film will adhere strongly and shrink to form an open netting at the temperature of bonding.

Having set forth the general nature of the invention, the following examples illustrate some specific embodiments of the invention. It is to be understood, however, that this invention is not limited to these examples since the invention may be practiced by the use of various modifications.

EXAMPLES 1-2

In these examples, the netting components were of polypropylene and were in the form of linearly oriented continuous filament orthogonal networks. Two layers of the same type of netting were used in each test, one with strength primarily in the machine direction (MD) and one with strength primarily in the cross-machine direction (TD). Films used in each of the examples other than the control experiment were of propylene/1-butene copolymer containing 14% butene with an intrinsic viscosity of 1.1 which had been oriented six times in each direction and having the thickness listed in Table II. The netting layers and the film were arranged to produce the composite structure prior to lamination shown in FIG. 3.

Two weights of polypropylene netting were employed. Type A nets had main filaments 150 microns in diameter and tie filaments 25 microns in diameter. There were 5 main filaments per centimeter and 10 tie filaments per centimeter so that the openings in the nets were about 1.3 by 1.2 millimeters across in the two perpendicular directions. These nets had a weight of 20 grams per square meter. The Frazier air permeability was 1144 ft$^3$/min/ft$^2$ (CFM). The Type B nettings had main filaments 100 microns in diameter and tie filaments 25 microns in diameter. There were 10 main filaments per centimeter and 15 tie filaments per centimeter so the openings in the nets were 0.9 by 0.7 millimeters across in the two perpendicular directions. These nets had a weight of 12 grams per square meter. The Frazier air permeability was 1240 ft$^3$/min/ft$^2$.

The laminating step was carried out by a continuous process. The control sample and Examples 1 and 2 were processed using a three roll vertical calender stack, similar to the diagram of FIG. 4. The calender consisted of three 8-inch diameter rolls, each of which was 44 inches wide. The rolls corresponding to roll 68 and roll 70 in FIG. 4 were made of steel covered with a Teflon-glass cloth. The gap between these two rolls was adjusted to apply pressure of 80 pounds per linear inch. Roll 68 was oil heated to a temperature of 120° C., and roll 70 was operated at 150° C. The roll corresponding to roll 72 was a steel rod covered with silicon rubber and oil heated to a temperature of 80° C. This roll was adjusted in spatial relationship to roll 70 to provide a linear pressure of 30 pounds per linear inch. An air blower, which consisted of a pipe with a 25 mil slit, was used to blow air at 80 psi onto the laminate after it emerged from the nip between rolls 70 and 72 in Example 2. Dwell time on the heated roll surfaces was 10 seconds. The control sample was processed without film under the same conditions as were used with film present in the other examples.

Physical tests, the results of which are shown in Table II, were performed according to ASTM standards, with the exception of the seam strength test. For the seam strength test, 2 in.×4 in. specimens were cut from sheets of the laminate. Then two of the specimens were placed face to face and the 2 inch-long edges were joined by sewing 6 stitches per inch, with cotton-wrapped polyester thread. The stitching was placed a half-inch from the edge of the specimen and the direction of stitching was the "test direction." The loose ends of the sewing thread were tied to prevent unraveling. The force in pounds per inch to cause seam failure was determined by drawing the test specimen in a tensile tester at 12 inches per minute.

The results in Table II show that the laminated network structures of the invention have good adhesion, substantially improved seam strength and at least 20% of the permeability of the unlaminated network structure. In the tests of interlaminar adhesion, the netting of the laminated structure actually tore before any separation of the netting layers occurred.

It is to be understood that the above description and drawings are illustrative of this invention and not in limitation thereof. As will be evident to those skilled in the art, various modifications can be made in light of the foclaims.

first direction and having a cross-section thereof smaller than the cross section of said main filaments.

5. A tear resistant thermoplastic reticulate open netting structure comprising:
   a first layer of oriented polypropylene netting,
   a second layer consisting essentially of a random copolymer having between about 7% to about 30% 1-butene and between about 93% to 70%

TABLE II.

PHYSICAL PROPERTIES OF LAMINATED NETWORK STRUCTURES

| Example No. | Control | Control | 1 | 2 | 3 | 4 | 5 |
|---|---|---|---|---|---|---|---|
| Netting Type | A | B | A | A | B | B | B |
| Film Thickness (mil) | None | None | 0.3 | 0.3 | 0.3 | 0.4 | 0.5 |
| Laminating Method | Roll | Roll | Roll | Roll | Roll | Roll | Roll |
| Weight, oz/yd$^2$ | 1.5 | 1.1 | 1.7 | 1.7 | 1.3 | 1.4 | 1.5 |
| Tensile Strength, lb/in. MD | 25 | 11 | 25 | 27 | 25 | 28 | 35 |
| Tensile Strength, lb/in. TD | 25 | 15 | 36 | 40 | 30 | 33 | 38 |
| Elongation at break, MD, % | 25 | 20 | 48 | 42 | 40 | 35 | 36 |
| Elongation at break, TD, % | 25 | 24 | 26 | 26 | 25 | 25 | 28 |
| Frazier Permeability, CFM | 1000 | 800 | 250 | 300 | 200 | 350 | 200 |
| Seam Strength, lb/in. MD | 4 | 2.7 | 10 | 8 | 7 | 9 | 11 |
| Seam Strength, lb/in. TD | 5 | 2.2 | 9 | 9 | 6 | 5 | 7 |
| Interlaminar Adhesion | Poor | Poor | Good | Good | Good | Good | Good |

What I claim and desire to protect by Letters Patent is:

1. A thermoplastic reticulate open netting structure with high sewn seam strength comprising:
   a first layer of oriented polypropylene netting,
   a second layer consisting essentially of a random copolymer having between about 7% and about 30% 1-butene and between about 93% and 70% propylene, said copolymer having an intrinsic viscosity of between about 1.1 and 4.0,
   said first and second layers being bonded together to form an open netting structure.

2. An open netting structure fabric of claim 1 wherein said first layer comprises a network structure having a plurality of parallel continuous main filaments extending in a first direction and having a substantially uniform cross-section and being substantially uniformly and continuously oriented, and a plurality of discontinuous parallel tie filaments extending in a second direction different from said first direction, said tie filaments interconnecting said main filaments and having no substantial portion thereof crossing over said main filaments, each of said tie filaments between each pair of adjacent main filaments having its longitudinal axis in said second direction in axial alignment with the longitudinal axis in said second direction of the adjacent tie filament.

3. The open netting structure of claims 1 or 2 wherein the average minimum dimension of each of the openings of the netting in said first layer is between about 0.5 millimeters and 5 millimeters.

4. An open netting structure as in claim 1 wherein said first layer comprises a network structure having a plurality of parallel continuous solid main filaments extending in a first direction and having a substantially uniform cross section and being substantially uniformly and continuously oriented, and a plurality of parallel solid tie filaments extending continuously across said main filaments in a second direction different from said propylene, said copolymer having an intrinsic viscosity of between about 1.1 and 4.0,
   a third layer of oriented polypropylene netting,
   said first, second and third layers being bonded together with said second layer substantially between said first and third layers.

6. An open netting structure as in claim 5 wherein said first layer comprises a first network structure having a plurality of parallel continuous main filaments extending in a first direction and having a substantially uniform cross-section and being substantially uniformly and continuously oriented, and a plurality of discontinuous parallel tie filaments extending in a second direction different from said first direction, said tie filaments interconnecting said main filaments and having no substantial portion thereof crossing over said main filaments, each of said tie filaments between each pair of adjacent main filaments having its longitudinal axis in said second direction in axial alignment with the longitudinal axis in said second direction of the adjacent tie filament, and
   wherein said third layer is a second network structure having a plurality of parallel continuous main filaments extending in a third direction different from said first direction and having a substantially uniform cross-section and being substantially uniformly and continuously oriented, and a plurality of parallel tie filaments extending in a direction other than said third direction, said tie filaments interconnecting said main filaments and having no substantial portion thereof crossing over said main filaments, each of said tie filaments between each pair of adjacent main filaments having a longitudinal axis in a fourth direction in axial alignment with the longitudinal axis in said fourth direction of the adjacent tie filaments.

7. An open netting structure as in claim 1 wherein said first direction is parallel to the longitudinal axis of said first network structure and said third direction is perpendicular to said first direction.

8. Process of making a tear resistant thermoplastic reticulate open netting structure comprising:
interposing a layer of biaxially oriented film between a first and second layer of oriented polypropylene netting, said layer of film having a thickness between about 0.25 mils to 2 mils and consisting essentially of a random copolymer having between about 7% to about 30% of 1-butene and between about 93% to 70% propylene, said copolymer having an intrinsic viscosity of between about 1.1 and 4.0, and oriented at least 2 times in each orthogonal direction,
applying pressure and heat to said layers of netting and film, said heat being applied at a temperature between approximately 5 degrees above the crystalline melting point of said copolymer and 150° C.

9. A process of making a tear-resistent thermoplastic reticulate open netting structure comprising:
placing a first layer of biaxially oriented film adjacent to a second layer of oriented polypropylene netting, said first layer of film having a thickness between about 0.25 mils to 2.0 mils and consisting essentially of a random copolymer having between about 7% to about 30% of 1-butene and between about 93% to 70% propylene, said copolymer having an intrinsic viscosity of between about 1.1 and 4.0,
applying pressure and heat to said layers of netting and film, said heat being applied at a temperature between approximately 5 degrees above the crystalline melting point of said copolymer and 150° C.

10. The process of claim 8 or 9 including the additional step of directing air onto the surface of said netting structure subsequent to said application of pressure and heat and while said netting structure is still at an elevated temperature to assure formation of a substantially uniformly opened netting structure.

11. The process of claim 8 or 9 wherein said random copolymer contains between about 10% to about 16% 1-butene.

12. The process of claim 8 or 9 wherein said oriented film has been stretched by a factor of at least 4 in each orthogonal direction.

13. The process of claim 8 or 9 wherein said film layer has a thickness between about 0.25 mils and 1.0 mils.

* * * * *

UNITED STATES PATENT AND TRADEMARK OFFICE
CERTIFICATE OF CORRECTION

PATENT NO. : 4,348,444
DATED : September 7, 1982
INVENTOR(S) : Alan D. Craig

It is certified that error appears in the above-identified patent and that said Letters Patent are hereby corrected as shown below:

Col. 1, line 43 after " enhanced " delete -- str -- and insert -- strength across the laminate in more than one direction. The product of this invention also has increased seam strength and resistance to impact. The process of this invention --.

Col. 4, line 4 " Nos. " should read -- No. --.

Col. 4, line 57 after " lateral " insert -- stretching using a tenter, or may be carried out simultaneously by lateral expansion of a tube of the plastic by air blowing while it is being drawn lineraly. Such processes --.

UNITED STATES PATENT AND TRADEMARK OFFICE
CERTIFICATE OF CORRECTION

PATENT NO. : 4,348,444
DATED : September 7, 1982
INVENTOR(S) : Alan D. Craig

It is certified that error appears in the above-identified patent and that said Letters Patent are hereby corrected as shown below:

Col. 7, line 8 delete " foclaims " and insert
-- foregoing disclosure and discussion without departure from the spirit or scope of the disclosure or from the scope of the claims --.

In the Claims, Col. 8, Claim 7 " as in claim 1 " should read -- as in claim 6 --.

Signed and Sealed this

Third Day of May 1983

[SEAL]

Attest:

Attesting Officer

GERALD J. MOSSINGHOFF

Commissioner of Patents and Trademarks